(12) United States Patent
Scully

(10) Patent No.: US 8,347,599 B2
(45) Date of Patent: Jan. 8, 2013

(54) FUEL CONTROL ARRANGEMENT

(75) Inventor: Mark Scully, Derby (GB)

(73) Assignee: Rolls-Royce, PLC, London (GB)

(*) Notice: Subject to any disclaimer, the term of this patent is extended or adjusted under 35 U.S.C. 154(b) by 827 days.

(21) Appl. No.: 12/453,763

(22) Filed: May 21, 2009

(65) Prior Publication Data

US 2009/0320482 A1 Dec. 31, 2009

(30) Foreign Application Priority Data

Jun. 30, 2008 (GB) .................................... 0811820.0

(51) Int. Cl.
*F02C 9/00* (2006.01)

(52) U.S. Cl. ........................................ 60/39.281; 60/734

(58) Field of Classification Search ............... 60/39.281, 60/734, 739, 740, 746
See application file for complete search history.

(56) References Cited

U.S. PATENT DOCUMENTS

| | | | |
|---|---|---|---|
| 2,881,827 A * | 4/1959 | Roche et al. .................. | 239/126 |
| 3,805,519 A * | 4/1974 | Plotnick et al. ................ | 60/223 |
| 4,337,616 A * | 7/1982 | Downing .................... | 60/39.281 |
| 5,402,634 A | 4/1995 | Marshall | |
| 5,809,771 A * | 9/1998 | Wernberg .................. | 60/39.094 |
| 5,881,550 A * | 3/1999 | Toelle ........................ | 60/39.094 |
| 6,955,040 B1 | 10/2005 | Myers, Jr. et al. | |
| 7,036,302 B2 | 5/2006 | Myers, Jr. et al. | |
| 7,093,420 B2 * | 8/2006 | Futa et al. .................. | 60/39.094 |
| 7,137,242 B2 * | 11/2006 | Griffiths .......................... | 60/243 |
| 7,540,141 B2 * | 6/2009 | Goldberg et al. ........... | 60/39.281 |
| 2008/0271456 A1 * | 11/2008 | Scully et al. ..................... | 60/740 |
| 2010/0058770 A1 * | 3/2010 | Ryan ............................... | 60/776 |

FOREIGN PATENT DOCUMENTS

| | | |
|---|---|---|
| EP | 1 331 448 A2 | 7/2003 |
| GB | 2 285 286 A | 7/1995 |

* cited by examiner

*Primary Examiner* — Phutthiwat Wongwian
(74) *Attorney, Agent, or Firm* — Oliff & Berridge, PLC

(57) ABSTRACT

A fuel control arrangement includes an injector control valve, a fuel supply structure including a primary supply path, a secondary supply path, and a splitter valve configured to split fuel flow between the primary supply path and the secondary supply path to thereby regulate fuel supply. The fuel control arrangement also includes a fuel injector directly connected to the injector control valve. The splitter valve is configured to split fuel flow between the secondary path and the injector control valve in response to a fuel pressure indicative of fuel demand. Further, the splitter is provided distal to the fuel injector and the injector control valve, to operate under different environmental conditions from the injector and the injector control valve. The injector control valve is actuated by a fluid pressure system controlled by a solenoid.

14 Claims, 2 Drawing Sheets

FUEL CONTROL ARRANGEMENT

The present invention relates to fuel control arrangements and more particularly to fuel control arrangements utilised in gas turbine engines.

BACKGROUND

Referring to FIG. 1, which is a sectional side view, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

Delivery of fuel within a gas turbine engine is important for achieving operational performance. A number of processes have been utilised in the past to control fuel supply within a gas turbine engine. Mechanical systems use rods and/or a unison ring to distribute and control displacement of fuel valves driven from a remote input drive system which is generally fuel pressure controlled typically using fueldraulic servo-activators. Such mechanical systems suffer since care must be taken with physical alignment and use of appropriate bearings, and thermal growth in the rods and unison ring must be considered. It will also be understood that a relatively large number of external dynamic seals are required for the system. Such seals present considerable fire and reliability problems.

More recently hydraulic control systems using pilot pressure to distribute control of fuel through fuel valves have been proposed. U.S. Pat. No. 6,955,040 and U.S. Pat. No. 7,036,302 provide examples of such hydraulically controlled fuel control arrangements and systems. Unfortunately such hydraulically controlled fuel control systems require considerable additional fuel lines and supplies along with wasted flow dynamics to produce the necessary thermal pressure control and to attempt to reduce lacquering of stagnated fuel or temperature damage to slowly moving fuel. Insufficient control of fuel lacquering can lead to valve functional defects. Furthermore, as there are no mechanical interconnections between the fuel valves at each fuel injector it is difficult to achieve the safety and reliability requirements for a convenient yet fully acceptable system.

A further prior approach to fuel control arrangements relates to utilisation of flexible drive actuation processes to control individual fuel valves by a remote drive system. Such flexible drive actuation systems have advantages but it will be understood that the control devices are located at the fuel injector and so in extremely high temperature environments about an engine core. These environmental considerations do not lend themselves to sensing actual or accurate fuel valve positions and therefore through feedback control loops adjusting necessary valve position for fuel requirements and demand. Furthermore there are system problems typically in relation to assembly and rigging to ensure that the assembly is correctly aligned for desired functionality.

SUMMARY

In accordance with aspects of the present invention there is provided a fuel control arrangement comprising a fuel injector coupled to an injector control valve, the fuel injector coupled through the injector control valve to a fuel supply comprising a splitter valve to regulate the fuel supply, the splitter valve is arranged to split fuel flow between a primary supply path and a secondary supply path to the injector control valve dependent upon fuel pressure indicative of fuel demand, the splitter valve provided at a displaced spatial position relative to the fuel injector and injector control valve to operate under different environmental conditions from the injector and injector control valve, and the injector control valve is actuated by a fluid pressure system controlled by a solenoid.

Typically, the fluid pressure system comprises a pneumatic or hydraulic actuator system. Typically, the injector control valve is coupled to a plurality of fluid pressure systems each controlled by a respective solenoid, each fluid pressure system arranged to define a particular injector control valve position for a respective fuel flow to the fuel injector.

Typically, a recirculation valve is provided between the primary and secondary flow paths.

Typically the re-circulation valve is actuated by a re-circulation fluid pressure system controlled by a solenoid. Typically, the re-circulation fluid pressure system is a pneumatic or hydraulic system.

Typically, a controller is provided to provide control signals to the splitter valve to define a fuel pressure.

Typically, a controller is provided for the fluid pressure system arranged to actuate the injector control valve.

Typically, a controller is provided to control the re-circulation fluid pressure system dependent upon the status of the injector control valve.

Generally, there is a plurality of fuel injectors with respective injector control valves.

Typically, the injector and injector control valve are adjacent to an engine core and the splitter valve is near a fan case of a gas turbine engine.

Possibly, the fluid pressure system for the injector control valves defines a leakage path for fuel leakage at the injector control valve.

Typically, the fluid pressure system for the injector control valve is arranged to provide a continuous fluid flow to purge fuel leaks in the injector control valve.

Generally, the injector control valve is configured to limit any thermal effect upon the fuel provided to the fuel injector.

DETAILED DESCRIPTION OF THE EMBODIMENTS

Figure 1:
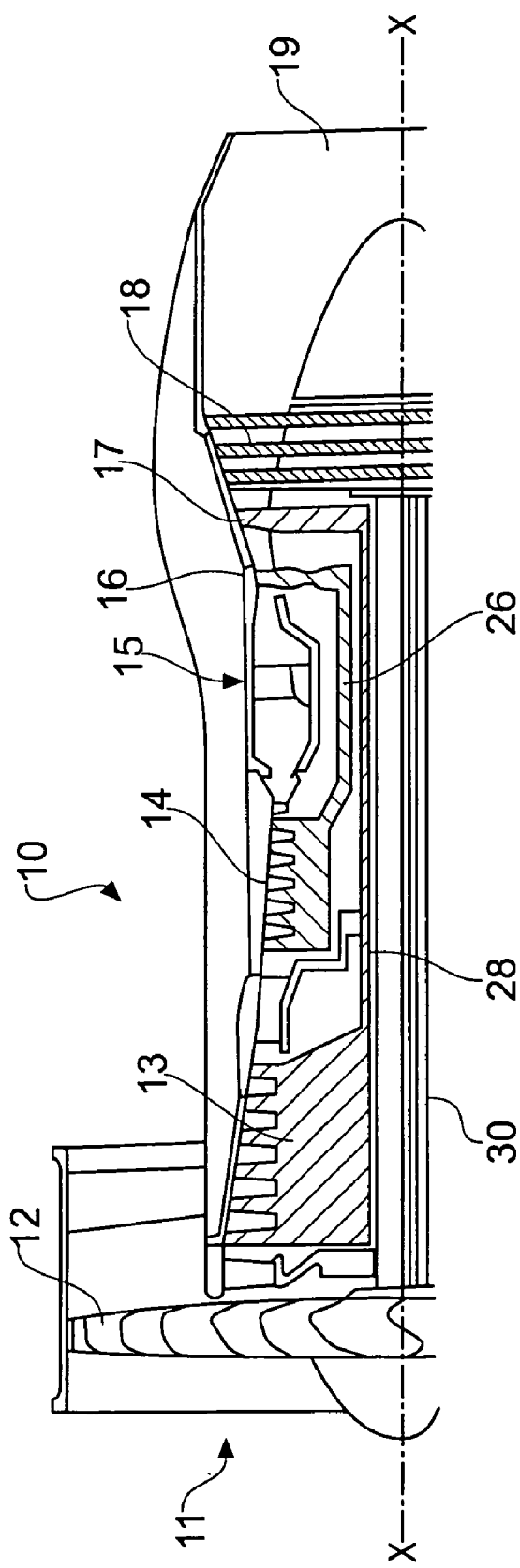
FIG. 1 is a cross-sectional side view of a gas turbine engine.

An embodiment of aspects of the present invention will now be described by way of example and with reference to FIG. 2 which is a schematic illustration of a fuel control arrangement in accordance with aspects of the present invention.

Efficient use of fuel, particularly in gas turbine engines, significantly affects operational performance and efficiency. Regulating fuel demand in relatively benign temperature locations has consistency advantages. It will be appreciated that fuel, by its nature, may degrade and lacquer if maintained in widely different temperature environments. Fuel injectors are located in relatively hot areas or zones of a gas turbine engine towards the combustor and engine core. Provision of fuel apportioning in response to demand in a benign environment, that is to say a relatively cool and stable environment such as near a fan case within a gas turbine, has advantages over providing such fuel apportioning nearer to the fuel injectors. In accordance with the present invention, as depicted in FIG. 2, fuel demand and apportioning is performed in a first zone A. Zone A incorporates a controller 40 which is connected through electrical pathways 41, 42 to a flow regulator or meter 43 and a solenoid set 44 for a fluid pressure control system that regulates fuel injector control valves as described later.

Flow meter 43 receives control signals from the controller 40. The flow meter 43 is coupled to a pump 45 to pump fuel to a desired pressure and a fuel demand indicator 46 to ensure that fuel is consistently presented. Of particular significance is provision of a splitter valve 47 in the relatively benign zone A of the engine.

The splitter valve 47 splits fuel flow between a primary fuel supply path 48 and a secondary fuel supply path 49. These fuel supply paths 48, 49 deliver fuel through appropriate pipe work to fuel injectors 50 via fuel injector control valves 51. Generally, the injector control valves 51 pass fuel to the fuel injectors 50 and any fuel not ejected through the injectors 50 may be returned to the secondary fuel supply path 49 to be returned to the splitter valve 47. Thus fuel flow through the circuit defined by the paths 48, 49, the splitter 47, the injector control valves 51 and the injectors 50 is continuous but varies dependent upon fuel demand.

The injector control valves 51 may be set such that no fuel is ejected through the injectors 50. In such circumstances fuel may linger within the fuel supply circuit comprising the paths 48, 49, valves 47, 51 and injectors 50. Stagnant fuel, particularly in the relatively hot zone C, may exhibit significant degradation. Consequently a recirculation valve 52 is provided between the primary supply path 48 and the secondary supply path 49 so that fuel is continually circulated to avoid or at least inhibit fuel degradation.

The splitter valve 47 provides the functions of meeting fuel demand and apportioning fuel between the supply paths 48, 49. The fuel injector control valves 51 generally act as on/off valves controlled by a fluid pressure system through the solenoid set 44. The fluid pressure system comprises a pneumatic or hydraulic actuator arrangement for each valve 51 as well as the recirculation valve 52. The solenoid set 44 provides a fluid pressure 53 which is utilised to actuate the valves 51. Generally a plurality of discrete fluid pressure actuator systems 54 will be provided. For example, the injector control valves 51 may all be set to open by fluid pressure actuation system 54a, or all the injector control valves 51 may be closed by pressure actuation system 54b or, by selective coupling of the injector control valves 51 to each pressure control system 54c, only desired valves 51 may be operated. The condition of a particular valve 51 will be set by the controller 40 sending control signals along the electrical pathway 42 to stimulate the solenoid set 44.

Fuel demand apportioning is performed by the splitter 47 in the relatively cool and benign zone A whilst switching of the injector control valves 51 is performed in hot zone C under the control of fluid pressure control systems 54 which are less environmentally sensitive. Solenoid set 44 can be located in an intermediate zone B between the relatively cool zone A and the hot zone C or where space is available. Generally, the fluid pressure system used to actuate the valves 51 use high pressure air such that elevated temperatures have little or no detrimental effect. The high pressure air is pressurised in any event and high temperatures may simply facilitate such high pressures generated by other means.

The fuel control arrangement comprises a single splitter valve 47 for all fuel demands. The splitter valve 47 splits fuel flow between the primary flow path 48 and the secondary flow path 49 to maintain fuel pressure at the injectors 50. The splitter valve 47 is actuated by fuel servo pressure presented through the flow meter 43 in response to control via a fuel demand signal from the controller 40. A position feedback sensor is installed to provide a feedback signal to the controller 40 to confirm responsiveness to fuel demands.

To control fuel flow to the injectors 50 a dedicated fuel injector control valve 51 is installed in close proximity to, and coupled with, each injector 50. The valve 51 acts as a shut off valve and operates in zone C. To provide reliable actuation of the valves 51 the remotely located fluid pressure system is provided comprising the fluid pressure actuation system 54 and solenoid set 44 controlled by the controller 40. The actuation system 54 utilises the remotely positioned solenoid set 44 to switch fluid pressure to each valve 51 dependent upon requirements. In a preferred arrangement a dedicated fluid pressure actuation system 54a, 54b, 54c is provided for a number of valve conditions, such as all closed, some open, all open, with a distribution system 54 for each valve 51 state.

A potential advantage of the present invention is the use of a single multi-position fuel splitter valve 47. By use of a single valve 47 significant control functionality is achieved and position sensing using conventional feedback devices is possible due to the benign environment. It will be understood that in this benign environment, where temperature is more controlled, spurious results due to thermal gradients and cycling are avoided and therefore consistency of response and so control can be achieved.

There is the potential for fuel leakage at the injector control valves 51. Consequently the fluid pressure actuation system 54 also defines a drainage or leakage path for fuel leaks from the injector control valve 51, whether in the open or closed position. Fuel drained or leaked into these paths can be exhausted through a vent hole 55 in the solenoid set 44. To facilitate such drainage the fluid pressure actuation system 54 is arranged to ensure a smooth continuous flow of pressurised fluid such as air to purge fuel leaks through the vent 55.

Aspects of the present invention provide a fuel control arrangement in which multiple fuel control valves 51 are controlled remotely by the solenoid set 44, itself controlled by specific control signals from the controller 40.

The splitter valve 47 acts as a fuel distribution valve which can be more freely positioned at a remote location from the injectors 50 and their respective injector control valves 51. Thus the splitter valve 47 can be more conveniently located within a control network.

Figure 2:
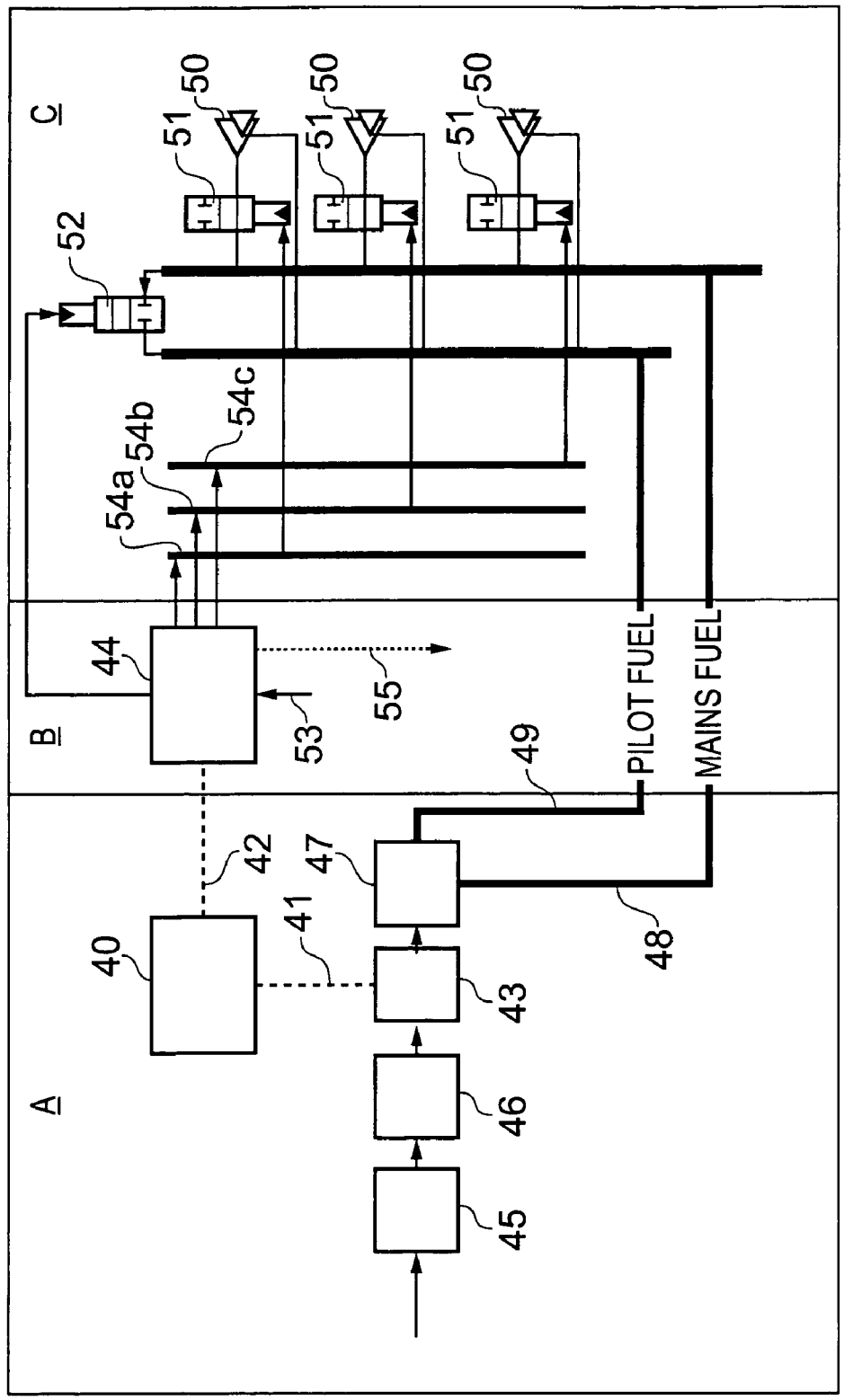
FIG. 2 is a schematic of a fuel control arrangement in accordance with aspects of the present invention.

As illustrated in FIG. 2, generally a number of fuel injectors 50 will be provided. The injectors 50 are coupled to a fuel distribution manifold supplied by the primary and secondary fuel supply paths 48, 49. Fuel pressure at the injectors 50 is governed by the splitter valve 47. The injector control valves 51 simply act as shut off valves. The fuel pressure at each injector 50 is the same since the manifold supplies all the injectors 50.

Modifications and alterations to aspects of the present invention will be appreciated by those skilled in the art. Thus, it will be understood that, where feasible, more feasible injector control valves 51 may be used that have different settings for regulating fuel flow to the injectors 50. These settings may be determined by the actuation signal from the solenoid set controlled by the controller 40 and the respective fluid actuation systems 54. Generally, each injector control valve 50 will still be coupled to the control pressure systems 54a, 54b, 54c so that there is consistency between the valves 51 and so the amount of fuel passed to each injector 50.

The invention claimed is:

1. A fuel control arrangement comprising:
an injector control valve;
a fuel supply structure including
 a primary supply path,
 a secondary supply path,
  a re-circulation valve that is provided between the primary supply path and the secondary supply path,
 a splitter valve configured to split fuel flow between the primary supply path and the secondary supply path to thereby regulate fuel supply; and
a fuel injector that is coupled to the injector control valve, wherein
 the splitter valve: i) is also configured to split fuel flow between the secondary path and the injector control valve in response to a fuel pressure indicative of fuel demand, and ii) is provided distal to the fuel injector and the injector control valve, to operate under different environmental conditions from the injector and the injector control valve, and
 the injector control valve is actuated by a fluid pressure system controlled by a solenoid set.

2. The fuel control arrangement as claimed in claim 1, wherein the fluid pressure system comprises a pneumatic or hydraulic system.

3. The fuel control arrangement as claimed in claim 1, wherein the injector control valve is coupled to a plurality of fluid pressure systems each controlled by the solenoid set, each fluid pressure system arranged to define a particular injector control valve position for the fuel flow to the fuel injector.

4. The fuel control arrangement as claimed in claim 1, wherein the re-circulation valve is actuated by a re-circulation fluid pressure system controlled by the solenoid set.

5. The fuel control arrangement as claimed in claim 1, wherein the re-circulation fluid pressure system is a pneumatic or hydraulic system.

6. The fuel control arrangement as claimed in claim 1, further comprising a controller configured to provide control signals to a flow meter valve to define a fuel pressure.

7. The fuel control arrangement as claimed in claim 1, wherein the fluid pressure system includes a controller configured to actuate the injector control valve.

8. The fuel control arrangement as claimed in claim 4, further comprising a controller configured to control the re-circulation fluid pressure system dependent upon a status of the injector control valve.

9. The fuel control arrangement as claimed in claim 1, further comprising a plurality of fuel injectors having respective injector control valves.

10. The fuel control arrangement as claimed in claim 1, wherein the injector and the injector control valve are adjacent to an engine core and the splitter valve is proximate a fan case of a gas turbine engine.

11. The fuel control arrangement as claimed in claim 1, wherein the fluid pressure system for the injector control valve defines a leakage path for fuel leakage at the injector control valve.

12. The fuel control arrangement as claimed in claim 1, wherein the fluid pressure system for the injector control valve is arranged to provide a continuous fluid flow to purge fuel leaks in the injector control valve.

13. The fuel control arrangement as claimed in claim 1, wherein the injector control valve is configured to limit any thermal effect upon the fuel provided to the fuel injector.

14. A gas turbine engine incorporating the fuel control arrangement as claimed in claim 1.

* * * * *